US009756145B2

(12) United States Patent
Narita et al.

(10) Patent No.: US 9,756,145 B2
(45) Date of Patent: Sep. 5, 2017

(54) INFORMATION PROVIDING APPARATUS, INFORMATION PROVIDING METHOD, AND COMPUTER PRODUCT

(71) Applicant: FUJITSU LIMITED, Kawasaki,shi, Kanagawa (JP)

(72) Inventors: Kenichiroh Narita, Sagamihara (JP); Hiroshi Katayama, Yokohama (JP); Yuuichi Inamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/264,606

(22) Filed: Apr. 29, 2014

(65) Prior Publication Data

US 2015/0026326 A1    Jan. 22, 2015

Related U.S. Application Data

(63) Continuation of application No. PCT/JP2011/076456, filed on Nov. 16, 2011.

(51) Int. Cl.
*G06F 15/16* (2006.01)
*H04L 29/08* (2006.01)
(Continued)

(52) U.S. Cl.
CPC .............. *H04L 67/32* (2013.01); *G06F 8/65* (2013.01); *G06Q 10/0631* (2013.01); *H04L 67/10* (2013.01)

(58) Field of Classification Search
CPC ..... H04L 41/50; H04L 67/32; H04L 67/1097; G06F 15/16
(Continued)

(56) References Cited

U.S. PATENT DOCUMENTS 5,357,439 A  * 10/1994  Matsuzaki  ....... G05B 19/41865
                                                      700/96
6,791,948 B1 *  9/2004  Desnoyers  .............. H04L 45/02
                                                      370/254
(Continued)

FOREIGN PATENT DOCUMENTS

JP      2001-51862      2/2001
JP      2002-318978    10/2002
(Continued)

OTHER PUBLICATIONS

Extended European Search Report mailed Mar. 6, 2015 for corresponding European Patent Application No. 11875882.0.
(Continued)

*Primary Examiner* — Tesfay Yohannes
(74) *Attorney, Agent, or Firm* — Staas & Halsey LLP

(57) ABSTRACT

An information providing apparatus includes a processor configured to input an inquiry for a change date candidate for changing specifications of hardware resources used in information processing related to a service; and a storage unit configured to store at least one among a planned backup date for a process result of the information processing related to the service and a planned restore date for the information processing related to the service using the process result. The processor is further configured to determine as the change date candidate, a date within at least one period among a first period from a date of input of the inquiry until the planned backup date and a second period after the planned restore date, by referring to the storage unit, and to output the determined change date candidate.

9 Claims, 20 Drawing Sheets

(51) Int. Cl.
*G06Q 10/06* (2012.01)
*G06F 9/445* (2006.01)

(58) Field of Classification Search
USPC .......................................... 709/223; 370/254
See application file for complete search history.

(56) References Cited

U.S. PATENT DOCUMENTS

| | | | |
|---|---|---|---|
| 7,779,393 B1* | 8/2010 | Manovit | G06F 11/2242 711/141 |
| 2002/0083398 A1* | 6/2002 | Takeyama | G06F 17/5045 716/102 |
| 2003/0061573 A1* | 3/2003 | Tsuchiya | G06F 17/5045 716/103 |
| 2004/0133483 A1* | 7/2004 | Potter | G07F 9/026 705/28 |
| 2005/0038806 A1* | 2/2005 | Ma | G06F 9/546 |
| 2006/0282617 A1* | 12/2006 | Nagasoe | G06F 3/0623 711/114 |
| 2007/0282651 A1 | 12/2007 | Naik et al. | |
| 2008/0201724 A1* | 8/2008 | Endrikhovski | G06F 3/04847 719/318 |
| 2011/0062903 A1* | 3/2011 | Li | H02P 5/46 318/400.02 |
| 2011/0251866 A1 | 10/2011 | Sengupta | |
| 2012/0233417 A1* | 9/2012 | Kalach | G06F 11/1469 711/162 |
| 2015/0127983 A1* | 5/2015 | Trobough | G06F 11/267 714/30 |

FOREIGN PATENT DOCUMENTS

| | | |
|---|---|---|
| JP | 2003-99267 | 4/2003 |
| JP | 2008-84029 | 4/2008 |
| JP | 2010-4335 | 1/2010 |
| JP | 2011-165129 | 8/2011 |

OTHER PUBLICATIONS

International Preliminary Report on Patentability mailed Jun. 19, 2014 for corresponding International Patent Application No. PCT/JP2011/076456.
International Search Report mailed Feb. 21, 2012 in corresponding International Patent Application No. PCT/JP2011/076456.
European Office Action dated Apr. 13, 2017 in corresponding European Patent Application No. 11875882.0.

* cited by examiner

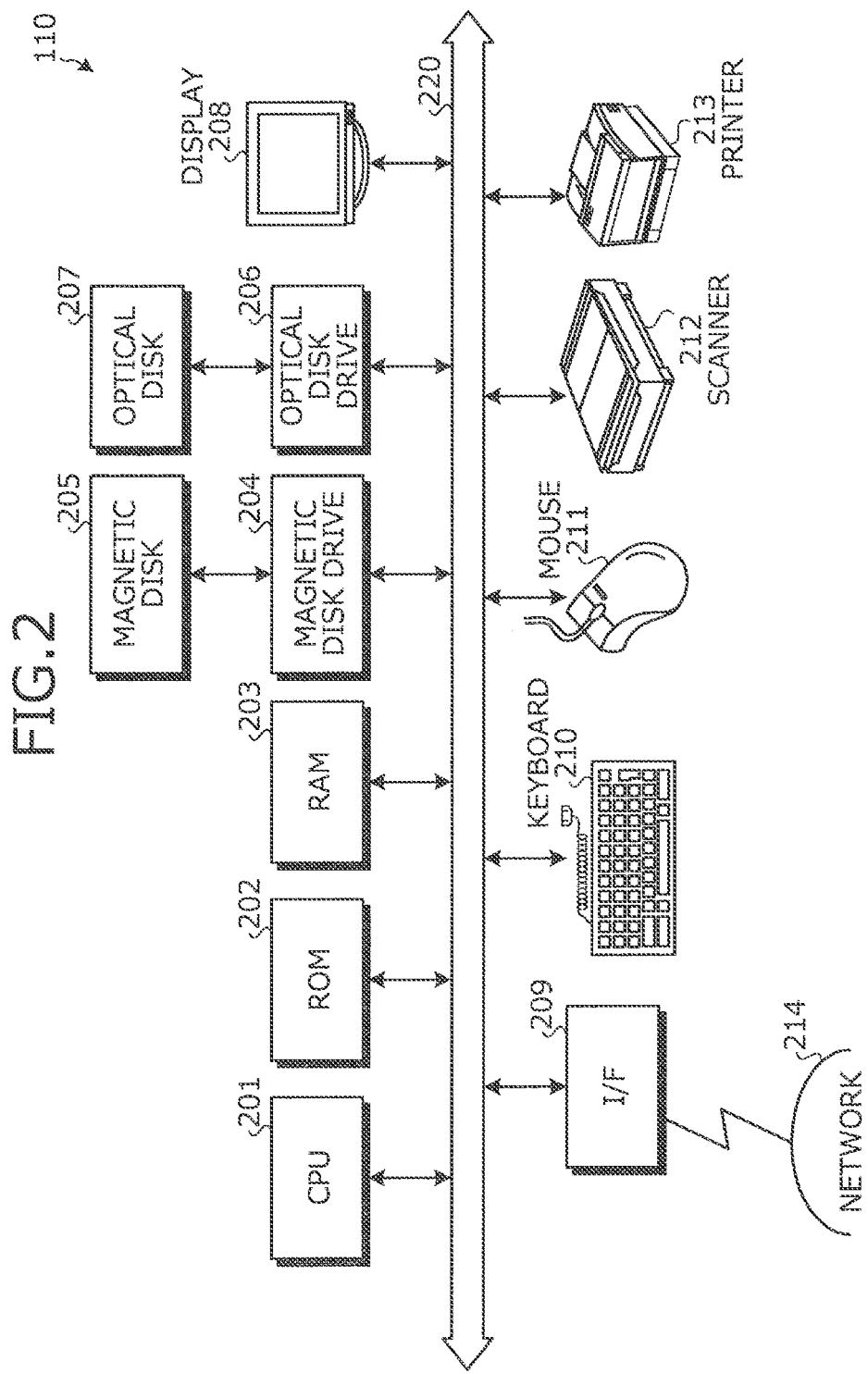

| EVENT ID | TARGET VIRTUAL ENVIRONMENT | PLANNED IMPLEMENTATION DATE | EVENT TYPE | EVENT RESULT FIELD |
|---|---|---|---|---|
| ev-0001 | VM-A | MONTH A DAY 1 | RESTORE | NOT IMPLEMENTED |
| ev-0002 | VM-B | MONTH B DAY 4 | BACKUP | NOT IMPLEMENTED |
| ev-0003 | VM-C | MONTH Z DAY 2 | BACKUP | FAILED |
| ev-0004 | VM-B | MONTH Z DAY 31 | RESTORE | SUCCESSFUL |
| ev-0005 | VM-A | MONTH B DAY 1 | BACKUP | NOT IMPLEMENTED |
| ev-0006 | VM-A | MONTH B DAY 31 | BACKUP | NOT IMPLEMENTED |
| ⋮ | ⋮ | ⋮ | ⋮ | ⋮ |

| NO | TARGET VIRTUAL ENVIRONMENT | TIME | TRAFFIC VOLUME |
|---|---|---|---|
| 0001 | VM-A | MONTH A DAY 1 | 100000 |
| 0002 | VM-A | MONTH A DAY 2 | 20000 |
| 0003 | VM-A | MONTH A DAY 4 | 30000 |
| 0004 | VM-A | MONTH A DAY 5 | 400000 |
| 0005 | VM-A | MONTH A DAY 6 | 500000 |
| ⋮ | ⋮ | ⋮ | ⋮ |

| DESIGNATED UPGRADE-PERIOD | DAY-OF-WEEK | PLANNED RESTORE-IMPLEMENTATION | PLANNED BACKUP-IMPLEMENTATION | UPGRADE CANDIDATE |
|---|---|---|---|---|
| MONTH A DAY 1 | MON | TRUE | FALSE | FALSE |
| MONTH A DAY 2 | TUE | FALSE | FALSE | TRUE |
| ... | ... | ... | ... | ... |
| MONTH A DAY 31 | MON | FALSE | FALSE | TRUE |
| MONTH B DAY 1 | TUE | FALSE | TRUE | FALSE |
| ... | ... | ... | ... | ... |
| MONTH B DAY 31 | TUE | FALSE | TRUE | FALSE |

| DAY-OF-WEEK | TRAFFIC VOLUME | CANDIDATE DETERMINED FROM TRAFFIC |
|---|---|---|
| MON | 50000 | FALSE |
| TUE | 60000 | FALSE |
| WED | 70000 | FALSE |
| THU | 80000 | FALSE |
| FRI | 90000 | FALSE |
| SAT | 30000 | FALSE |
| SUN | 10000 | TRUE |

| DESIGNATED UPGRADE-PERIOD | DAY-OF-WEEK | PLANNED UPGRADE-IMPLEMENTATION | CANDIDATE DETERMINED FROM PLANNED UPGRADE-IMPLEMENTATION |
|---|---|---|---|
| MONTH A DAY 2 | TUE | TRUE | TRUE |
| ... | ... | ... | ... |
| MONTH A DAY 14 | SUN | TRUE | TRUE |
| ... | ... | ... | ... |
| MONTH A DAY 31 | MON | FALSE | FALSE |

| DESIGNATED UPGRADE-PERIOD | CANDIDATE DETERMINED FROM TRAFFIC | CANDIDATE DETERMINED FROM PLANNED UPGRADE-IMPLEMENTATION | CANDIDATE DEGREE |
|---|---|---|---|
| MONTH A DAY 2 | TRUE | FALSE | 1 |
| --- | --- | --- | --- |
| MONTH A DAY 14 | TRUE | TRUE | 2 |
| --- | --- | --- | --- |
| MONTH A DAY 30 | FALSE | TRUE | 1 |
| MONTH A DAY 31 | FALSE | FALSE | 0 |

FIG.10

UPGRADE APPLICATION SCREEN

LOGIN USER: testuser01

DESIGNATED UPGRADE-PERIOD

[A ▼] MONTH [2 ▼] DAY ~ [A ▼] MONTH [31 ▼] DAY

SELECT TARGET VM

[VM-A ▼]

VM CONFIGURATION INFORMATION
HDD: 50 GB
MEMORY: 4 GB
CPU: 8 GHz
OS: Windows5008

SELECT UPGRADE DETAILS

UPGRADE INFORMATION

ADDITIONAL HDD: [100 GB ▼]
ADDITIONAL MEMORY: [2 GB ▼]
ADDITIONAL CPU: [5 GHz ▼]

[ UPGRADE APPLICATION BUTTON ]

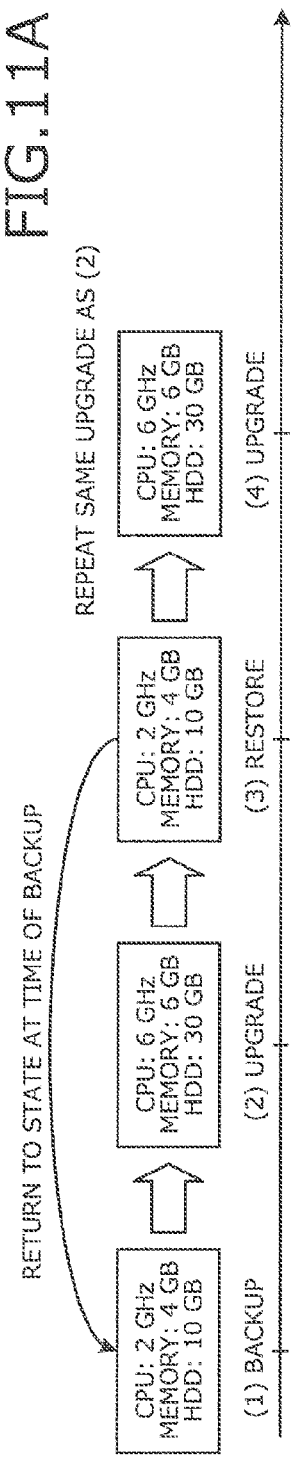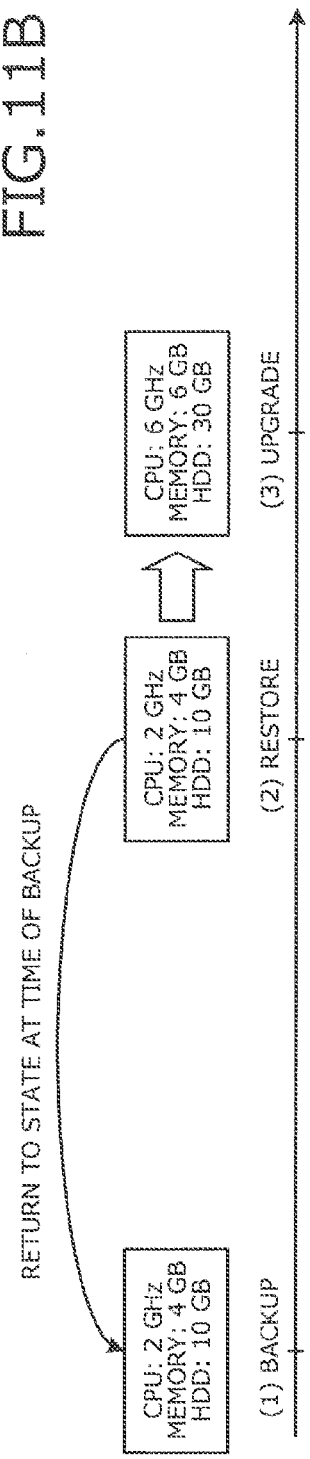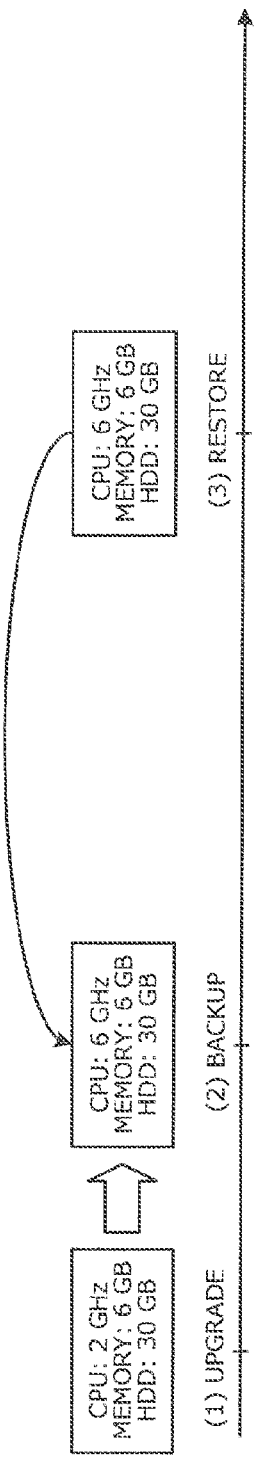

FIG. 12

Table 300:

| EVENT ID | TARGET VM | PLANNED IMPLEMENTATION DATE | EVENT TYPE | EVENT RESULT FIELD |
|---|---|---|---|---|
| ev-0001 | VM-A | MONTH A DAY 1 | RESTORE | NOT IMPLEMENTED |
| ev-0005 | VM-A | MONTH B DAY 1 | BACKUP | NOT IMPLEMENTED |
| ev-0006 | VM-A | MONTH B DAY 31 | BACKUP | NOT IMPLEMENTED |

Table 500:

| DESIGNATED UPGRADE-PERIOD | DAY-OF-WEEK | PLANNED RESTORE-IMPLEMENTATION | PLANNED BACKUP-IMPLEMENTATION | UPGRADE CANDIDATE |
|---|---|---|---|---|
| MONTH A DAY 1 | MON | TRUE | FALSE | FALSE |
| MONTH A DAY 2 | TUE | FALSE | FALSE | TRUE ~1203 |
| --- | --- | --- | --- | --- |
| MONTH A DAY 31 | MON | FALSE | FALSE ~1202 | TRUE |
| MONTH B DAY 1 | TUE | FALSE | TRUE | FALSE |
| --- | --- | --- | --- | --- |
| MONTH B DAY 31 | TUE | FALSE ~1201 | TRUE | FALSE |

AFTER PLANNED RESTORE DATE

BEFORE PLANNED BACKUP DATE

FIG.15

```
MR. ○○
SERVICE SUBJECT TO UPGRADE: XXXXXX

UPGRADE DATE CANDIDATES FROM MONTH A DAY 1 TO MONTH B DAY 31
ARE AS FOLLOWS:
STRONGEST DATE CANDIDATE
MONTH A DAY 14 (SUN)
SECOND DATE CANDIDATES
MONTH A DAY 2 (TUE)
MONTH A DAY d (SUN)
MONTH A DAY 30 (SUN)

ACCESS FOLLOWING URL TO SET UPGRADE DATE
http://○○○○

THIS EMAIL WAS SENT FROM SEND-ONLY EMAIL ADDRESS
DO NOT REPLY TO THIS E-MAIL
```

FIG.16

| LIST OF DATE CANDIDATES | |
|---|---|
| STRONGEST DATE CANDIDATE | |
| ● | MONTH A DAY 14 (SUN) |
| SECOND DATE CANDIDATES | |
| ○ | MONTH A DAY 2 (TUE) |
| ○ | MONTH A DAY d (SUN) |
| ○ | MONTH A DAY 30 (SUN) |
| SECOND DATE CANDIDATES | |
| ○ | MONTH   DAY |

UPGRADE DATE SETTING BUTTON

US 9,756,145 B2

INFORMATION PROVIDING APPARATUS, INFORMATION PROVIDING METHOD, AND COMPUTER PRODUCT

CROSS REFERENCE TO RELATED APPLICATIONS

This application is a continuation application of International Application PCT/JP2011/076456, filed on Nov. 16, 2011 and designating the U.S., the entire contents of which are incorporated herein by reference.

FIELD

The embodiment discussed herein is related to an information providing apparatus, an information providing method, and a computer product that provide information.

BACKGROUND

Services that utilize a cloud system include a service that provides a virtual environment (virtual machine (VM)), for example. According to a request from a user of the virtual environment, upgrade of the virtual environment is performed on an upgrade date designated by the user.

A related technique is a technique of performing an update job of a physical machine after a backup job (see, e.g., Japanese Laid-Open Patent Publication No. 2010-4335). Another related technique is a technique of notifying a user of information (see, e.g., Japanese Laid-Open Patent Publication No. 2002-318978).

Nonetheless, the upgrade date designated by the user is not a date determined with consideration of information managed on a service provider side such as a planned backup date and a planned restore (restoration) date. Therefore, the upgrade date designated by a user is not necessarily a date suitable for performing the upgrade.

For example, it is assumed that a user designates, as an upgrade date, a date included in a period after a planned backup date and before a planned restore date. In this case, the restore returns the virtual environment to the state at the time of backup before the upgrade and therefore, the same upgrade must be performed again.

If upgrade is performed in this way, the service provider side must perform the same upgrade twice, causing a problem of increased maintenance management work. Meanwhile, this situation is inconvenient for the service user side because the virtual environment cannot be used during upgrade.

If the user refers to information managed by the service provider side, a suitable upgrade date can be determined. However, if the information managed by the service provider side is made public, a large number of users will use the virtual environment immediately before the planned backup date for data protection and therefore, an increased load on the virtual environment may make it impossible to provide stable service. Additionally, if the information managed by the service provider side is made public, unauthorized data may be added to data that is to be backed up and may threaten security. Therefore, a user cannot be allowed to refer to the information managed on the service provider side, in terms of the stable provision and security of the service.

SUMMARY

According to an aspect of an embodiment, an information providing apparatus includes a processor configured to input an inquiry for a change date candidate for changing specifications of hardware resources used in information processing related to a service; and a storage unit configured to store at least one among a planned backup date for a process result of the information processing related to the service and a planned restore date for the information processing related to the service using the process result. The processor is further configured to determine as the change date candidate, a date within at least one period among a first period from a date of input of the inquiry until the planned backup date and a second period after the planned restore date, by referring to the storage unit, and to output the determined change date candidate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram of a hardware configuration of an information providing apparatus according to the embodiment;

FIG. 3 is an explanatory view of the storage contents of the event DB;

FIG. 4 is an explanatory view of the storage contents of the traffic log;

FIG. 5 is an explanatory view of the storage contents of the upgrade period candidate DB;

FIG. 6 is an explanatory view of the storage contents of the upgrade candidate day-of-week DB;

FIG. 7 is an explanatory view of the storage contents of the upgrade date candidate DB;

FIG. 8 is an explanatory view of the storage contents of the final upgrade date candidate DB;

FIG. 10 is an explanatory view of an example of the upgrade application screen displayed on the utilization terminal 120;

FIGS. 11A, 11B, and 11C are explanatory views of relationships among events of backup, restore, and upgrade;

FIG. 12 is an explanatory view of determination of an upgrade period candidate based on the relationship among backup, restore, and upgrade;

FIG. 15 is an explanatory view of details of notification of the upgrade date candidate;

FIG. 16 is an explanatory view of details of the upgrade date determination screen;

DESCRIPTION OF EMBODIMENTS

Embodiments of an information providing apparatus, information providing method, and information providing program according to the present invention will be described in detail with reference to the accompanying drawings. To upgrade a service on a suitable date, the information providing apparatus according to an embodiment provides to a user, an upgrade date candidate based on information on a service provider side such as a planned backup date and a planned restore date of a virtual environment. As a result, the upgrade can be performed on a suitable date. Because the information on the provider side is not directly known by a service user, the security of the provider side can be ensured and stable provision of the service can be achieved.

Figure 1:
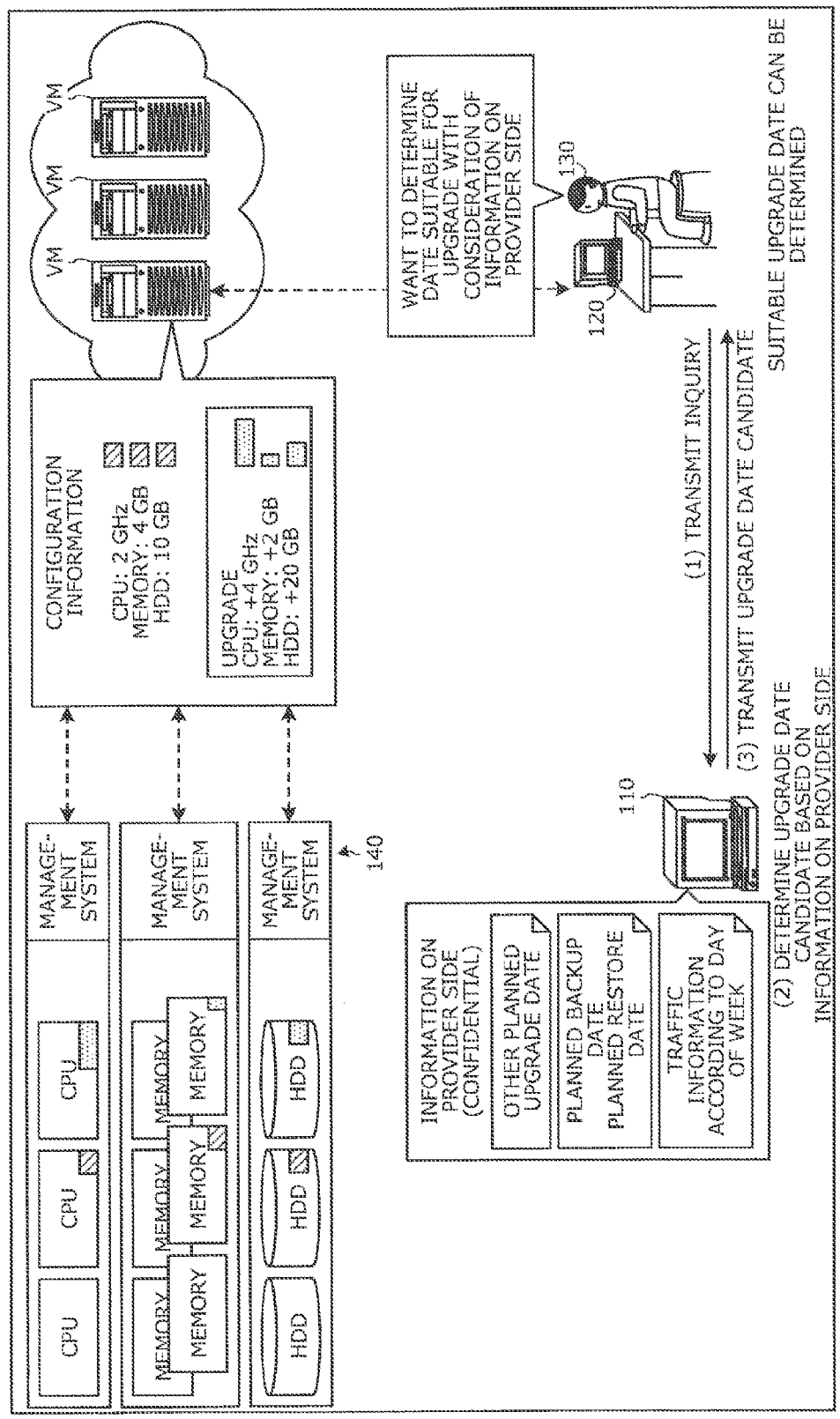
FIG. 1 is an explanatory view of details of provision of an upgrade date candidate by the information providing apparatus.

FIG. 1 is an explanatory view of details of provision of an upgrade date candidate by the information providing apparatus. In a system depicted in FIG. 1, service is provided from a service provider side to a user 130, via a network (cloud). The service provider side refers to a service providing vender that allows a utilization terminal 120 (so-called connection environment) of the user 130 to connect to hardware resources 140 (CPU, ROM, HDD) of the service provider side and allows the user 130 to use the hardware resources 140. The service provider side performs maintenance and management of the service.

For example, a service provided from the provider side may be provision of a platform for executing an application such as an application server, or provision of hardware or infrastructure such as a virtual server and a shared disk. In FIG. 1, the provider side generates a virtual environment VM on a cloud by using a management system to assign the hardware resources 140 belonging to the provider side. For example, the provider side generates a virtual server to which is assigned two gigahertz (GHz) of the CPU, four gigabytes (GB) of memory, and 10 GB of a HDD.

The provider side retains in an information providing apparatus 110, information of the provider side such as a planned backup date and a planned restore date of the virtual environment VM to perform maintenance management work of the virtual environment VM. On the other hand, the user 130 uses the utilization terminal 120 to utilize the virtual environment VM.

The virtual environment VM may be upgraded on a demand from the user 130. An upgrade refers to an expansion of the hardware resources 140 assigned to the virtual environment VM. For example, the upgrade refers to increasing the assigned respective hardware resources by 4 GHz for the CPU, 2 GB for the memory, and 20 GB for the HDD.

However, if the upgrade is performed, the virtual environment VM must be set to an unusable state. Therefore, the upgrade should be performed on a day when the period that the virtual environment VM is unusable, is as short as possible and the maintenance management work can be made more efficient.

Details of provision of an upgrade date candidate by the information providing apparatus 110 will be described by taking, as an example, a case where the user 130 attempts to determine an upgrade date to perform upgrade.

First, the user 130 attempts to determine a suitable upgrade date; however, because the information on the provider side is kept confidential, the user 130 cannot determine a suitable upgrade date using the information on the provider side.

(1) Therefore, the user 130 transmits to the information providing apparatus 110, an inquiry for an upgrade date candidate via the utilization terminal 120. The inquiry may include information concerning a designated upgrade-period designated by the user 130.

(2) The information providing apparatus 110 receiving the inquiry determines a upgrade date candidate suitable for the upgrade based on the information on the provider side. If the inquiry includes the information concerning the designated upgrade-period, the information providing apparatus 110 determines an upgrade date candidate within the designated upgrade-period. The information on the provider side includes a planned backup date, a planned restore date, a planned upgrade date, and traffic information for each day of the week of the virtual environment VM.

(3) The information providing apparatus 110 transmits the determined upgrade date candidate to the utilization terminal 120. As a result, the user 130 can determine a suitable upgrade date based on the upgrade date candidate transmitted from the information providing apparatus 110 to the utilization terminal 120 even if the information on the provider side is unknown.

Since upgrade is performed on a date suitable for the upgrade, the downtime of the virtual environment VM due to the upgrade can be reduced and the maintenance management work can be made more efficient. Since the information of the provider side is not directly known by the user 130, the security of the provider side can be ensured and the stable supply of the service can be achieved.

With reference to FIG. 2, an example of a hardware configuration of the information providing apparatus 110 according to the embodiment will be described.

FIG. 2 is a block diagram of a hardware configuration of the information providing apparatus according to the embodiment. As depicted in FIG. 2, the information providing apparatus includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 220.

The CPU 201 governs overall control of the information providing apparatus. The ROM 202 stores therein programs such as a boot program. The RAM 203 is used as a work area of the CPU 201. The RAM 203 stores an event database (DB), a traffic log, an upgrade period candidate DB, an upgrade day-of-week candidate DB, an upgrade date candidate DB, and a final upgrade date candidate DB. The event DB, the traffic log, the upgrade period candidate DB, the upgrade day-of-week candidate DB, an upgrade date candidate DB, and a final upgrade date candidate DB may be stored to the magnetic disk 205 rather than the RAM 203.

The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 214 such as a local area network (LAN), a wide area network (WAN), and the Internet through a communication line and is connected to other apparatuses through the network 214. The I/F 209 administers an internal interface with the network 214 and controls the input/output of data from/to external apparatuses. For example, a modem or a LAN adaptor may be employed as the I/F 209.

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the information providing apparatus. The scanner 212 may have an optical character reader (OCR) function as well. The printer 213 prints image data and text data. The printer 213 may be, for example, a laser printer or an ink jet printer.

The storage contents of the event DB stored in the RAM 203 depicted in FIG. 2 will be described with reference to FIG. 3.

FIG. 3 is an explanatory view of the storage contents of the event DB. An event DB 300 has a target virtual environment field, a planned implementation date field, an event type field, and an event result field corresponding to each event ID field, forms a record each time an event is generated, and updates a record each time an event is performed.

The event ID field stores identification (ID) identifying an event. The target virtual environment field stores an identifier identifying the virtual environment VM subject to an event.

The planned implementation date field stores a planned date for implementing the event. The event type field stores details of the event. Details of the event include, for example, "restore", "backup", and "upgrade". The event result field stores a result when the event is performed.

The "planned restore date" described with reference to FIG. 1 is the date in the planned implementation date field of a record having "restore" in the event type field. The "planned backup date" described with reference to FIG. 1 is the date in the planned implementation date field of a record having "backup" in the event type field. The "planned upgrade date" described with reference to FIG. 1 is the date in the planned implementation date field of a record having "upgrade" in the event type field.

The storage contents of the traffic log stored in the storage device such as the RAM 203 and the magnetic disk 205 depicted in FIG. 2 will be described with reference to FIG. 4.

FIG. 4 is an explanatory view of the storage contents of the traffic log. A traffic log 400 has a target virtual environment field, a time field, and a traffic volume field corresponding to each entry in a No field, and forms a record for each date.

The No field stores a number of a log. The target virtual environment field stores an identifier identifying the virtual environment VM subject to traffic volume measurement. The time field stores the date of the traffic volume measurement. The traffic volume field stores the daily traffic volume.

The storage contents of the upgrade period candidate DB stored in the storage device such as the RAM 203 and the magnetic disk 205 depicted in FIG. 2 will be described with reference to FIG. 5. The upgrade period candidate DB is created based on the event DB 300.

FIG. 5 is an explanatory view of the storage contents of the upgrade period candidate DB. A upgrade period candidate DB 500 has a day-of-week field, a planned restore-implementation field, a planned backup-implementation field, and an upgrade candidate field corresponding to each designated upgrade-period field, and forms a record for each date in the designated upgrade-period fields.

The designated upgrade-period field stores a date within a period that is a population from which a upgrade date candidate is selected. For example, this date is a date within the designated upgrade-period designated by the user 130 described above. The day-of-week field stores the day of the week corresponding to the date of the designated upgrade-period field.

The planned restore-implementation field stores indication of whether the date is the planned restore date. The planned restore-implementation field is set based on a record having the event type "restore" in the event DB 300. In FIG. 5, "true" is stored for the planned restore date and "false" is stored for a date other than the planned restore date.

The planned backup-implementation field stores whether the date is the planned backup date. The planned backup-implementation field is set based on a record having the event type "backup" in the event DB 300. In FIG. 5, "true" is stored for the planned backup date and "false" is stored for a date other than the planned backup date.

The upgrade candidate field stores a result of determination of whether a date can be an upgrade date candidate determined from the contents of the planned restore-implementation field and the planned backup-implementation field. In FIG. 5, "true" is stored if a date can be an upgrade date candidate and "false" is stored if a date cannot be an upgrade date candidate.

The storage contents of the upgrade candidate day-of-week DB stored in the storage device such as the RAM 203 and the magnetic disk 205 depicted in FIG. 2 will be described with reference to FIG. 6. The upgrade candidate day-of-week DB is created based on the traffic log 400.

FIG. 6 is an explanatory view of the storage contents of the upgrade candidate day-of-week DB. An upgrade candidate day-of-week DB 600 has a traffic volume field and a field indicating a candidate determined from traffic, corresponding to each day-of-week field, and forms a record for each day of the week.

The day-of-week field stores a day of the week from Monday to Sunday. The traffic volume field stores the traffic volume for the day of the week. The contents of the traffic volume field are obtained based on the contents of the traffic volume fields of the traffic log 400. For example, the contents of the traffic volume field are an average value of each day of the week obtained by summing the contents of the traffic volume fields of the traffic log 400 for each day of the week.

The field indicating a candidate determined from traffic stores a result of determination of whether the day of the week can be an upgrade date candidate based on a traffic volume. For example, it is determined that the day of the week having the smallest traffic volume can be an upgrade date candidate. Alternatively, it is determined that the day of the week having a traffic volume less than or equal to a threshold value can be an upgrade date candidate. In FIG. 6, "true" is stored if the day if the week can be an upgrade date candidate and "false" is stored if the day of the week cannot be an upgrade date candidate.

The storage contents of the upgrade date candidate DB stored in the storage device such as the RAM 203 and the magnetic disk 205 depicted in FIG. 2 will be described with reference to FIG. 7. The upgrade date candidate DB is created based on the event DB 300.

FIG. 7 is an explanatory view of the storage contents of the upgrade date candidate DB. An upgrade date candidate DB 700 has a day-of-week field, a planned upgrade-implementation field, and a field indicating a candidate determined from the planned upgrade-implementation, corresponding to each designated upgrade-period field, and forms a record for each date within the designated upgrade-period.

The designated upgrade-period field and the day-of-week field have the same contents as the designated upgrade-period field and the day-of-week field, respectively, of the upgrade period candidate DB 500 depicted in FIG. 5 and therefore, will not be described.

The planned upgrade-implementation field stores indication of whether implementation of an upgrade is planned. The planned upgrade-implementation field is set based on a record having the event type "upgrade" in the event DB 300. In FIG. 7, "true" is stored for the planned upgrade date and "false" is stored for a date other than the planned upgrade date.

The field indicating a candidate determined from planned upgrade-implementation stores a result of determination concerning whether a date can be an upgrade date candidate based on a planned upgrade date. In FIG. 7, "true" is stored if the date can be an upgrade date candidate and "false" is stored if the date cannot be an upgrade date candidate.

The storage contents of the final upgrade date candidate DB stored in the storage device such as the RAM 203 and the magnetic disk 205 depicted in FIG. 2 will be described with reference to FIG. 8. The final upgrade date candidate DB is created based on the upgrade period candidate DB 500, the upgrade candidate day-of-week DB 600, and the upgrade date candidate DB 700.

FIG. 8 is an explanatory view of the storage contents of the final upgrade date candidate DB. A final upgrade date candidate DB 800 has a field indicating candidates determined from traffic, a field indicating candidates determined from planned upgrade-implementation, and a candidate degree field, corresponding to each designated upgrade-period field, and forms a record for each date within the designated upgrade-period.

The designated upgrade-period field has the same contents as the designated upgrade-period field of the upgrade period candidate DB 500 depicted in FIG. 5. The field indicating a candidate determined from traffic has the same contents as the field of candidate determined from traffic of the upgrade candidate day-of-week DB 600 depicted in FIG. 6. The field indicating a candidate determined from planned upgrade-implementation has the same contents as the field indicating a candidate determined from planned upgrade-implementation of the upgrade date candidate DB 700 depicted in FIG. 7.

The candidate degree field stores the priority of an upgrade date candidate. In FIG. 8, a date with a higher number in the candidate degree field has higher priority and is more suitable for the upgrade. For example, if both the field for a candidate determined from traffic and the field for a candidate determined from planned upgrade-implementation have "true", the priority is set to "2". If either is "true", the priority is set to "1" and if both are "false", the priority is set to "0".

An example of a functional configuration of the information providing apparatus 110 will be described.

Figure 9:
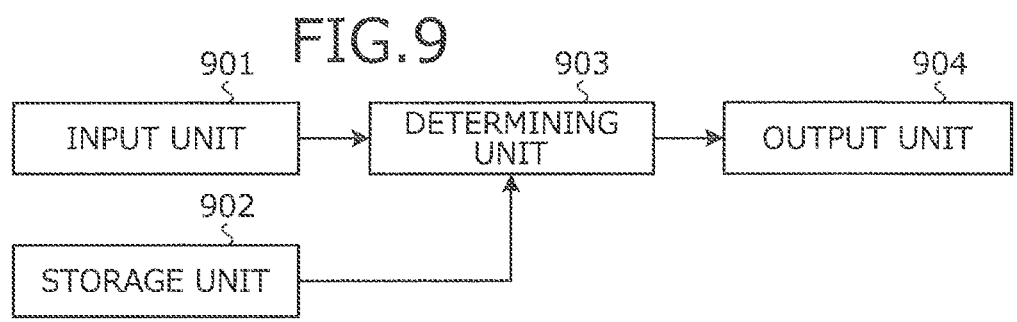
FIG. 9 is a block diagram of a functional configuration of the information providing apparatus 110.

FIG. 9 is a block diagram of a functional configuration of the information providing apparatus 110. The information providing apparatus 110 includes an input unit 901, a storage unit 902, a determining unit 903, and an output unit 904. For example, these functions (the input unit 901 to the output unit 904) acting as a control unit are implemented by causing the CPU 201 to execute programs stored in a storage device such as the ROM 202, the RAM 203, the magnetic disk 205, and the optical disk 207 depicted in FIG. 2, or by I/F 209.

The input unit 901 has a function of inputting an inquiry for a change date candidate for changing specifications of the hardware resources 140 used in information processing related to a service. The inquiry for a change date candidate may include information identifying a third period. The hardware resources 140 used in information processing related to service are, for example, the hardware resources 140 (CPU, ROM, HDD) assigned to the generation of the virtual environment VM described above.

The change date for changing specifications of the hardware resources 140 is the date on which the hardware resources 140 assigned to the virtual environment VM are changed, and is the planned upgrade date, for example. A change in specifications of the hardware resources 140 is not limited to upgrade and may include downgrade. The change date candidate is the upgrade date candidate described above, for example. The third period is a period designated by the user 130 and is the designated upgrade-period described above, for example.

For example, the input unit 901 inputs an inquiry for the upgrade date candidate. This enables the input unit 901 to input a trigger for starting the determination of the upgrade date candidate. Alternatively, for example, the input unit 901 receives an inquiry for the upgrade date candidate including the designated upgrade-period. This enables the input unit 901 to input a period used as a population that can be the upgrade date candidate. The input data is stored in a storage area of the RAM 203, the magnetic disk 205, the optical disk 207, etc.

The storage unit 902 has a function of storing a planned date that is either a planned backup date for a process result of information processing related to service or a planned restore date for information processing related to service using a process result. The storage unit 902 is the RAM 203 described above.

The planned backup date is a date on which a backup event is planned, and is a future date when the backup is not yet implemented. The planned restore date is a date on which a restore event is planned, and is a future date when the restore is not yet implemented.

For example, the storage unit 902 stores the event DB 300. As a result, the storage unit 902 can store the planned backup date and the planned restore date referenced when the upgrade date candidate is determined.

The determining unit 903 has a function of determining as a change candidate date, a date within at least one period among a first period from the date of input of the inquiry by the input unit 901 until the planned backup date and a second period after the planned restore date, by referring to the storage unit 902.

The first period is, for example, a period from the date of input of the inquiry until the earliest planned backup date among the planned backup dates stored in the event DB 300.

The second period is, for example, a period after the earliest planned restore date among the planned restore dates stored in the event DB 300. The determination result is stored to a storage area of the RAM 203, the magnetic disk 205, the optical disk 207, etc.

For example, if the planned backup date is a date before the planned restore date, the determining unit 903 determines a date within the first period as the change date candidate. In particular, for example, the determining unit 903 determines the upgrade date candidate from a period that is from the date of input of the inquiry until the planned backup date. As a result, the earliest possible date can be determined as the upgrade date candidate.

For example, if the planned backup date is a date after the planned restore date, the determining unit 903 determines as the change date candidate a date within the period from the backup candidate date until the restore candidate date. In particular, for example, the determining unit 903 determines the upgrade date candidate from a period that is from the planned backup date until the planned restore date. As a result, a date suitable for upgrade can be determined as the upgrade date candidate.

For example, the determining unit 903 determines the change date candidate based on information concerning the utilization frequency of a service. In particular, for example, the determining unit 903 determines an upgrade date candidate that is on the day of the week having the smallest traffic volume based on the traffic log 400. As a result, the effect on the user 130 can be reduced when the virtual environment VM becomes unusable due to upgrade.

For example, the determining unit 903 determines as the change date candidate, an already determined planned change date for specifications. In particular, for example, the determining unit 903 determines as the upgrade date candidate, the planned upgrade date. As a result, multiple upgrades can be performed together on the same date to reduce the period that the virtual environment VM is unusable due to upgrade.

For example, the determining unit 903 determines the change date candidate based on the first period, the second period, and the third period. In particular, for example, the determining unit 903 refers to the planned backup date and the planned restore date that are within only the designated upgrade-period to determine the upgrade date candidate. As a result, the candidate upgrade date can be determined with consideration of a demand from the user 130.

The output unit 904 has a function of outputting the change date candidate determined by the determining unit 903. For example, the output unit 904 outputs the upgrade date candidate determined by the determining unit 903. Forms of output include display on the display 208, print output to the printer 213, and transmission to an external apparatus by the I/F 209. The output may be stored to a storage area of the RAM 203, the magnetic disk 205, the optical disk 207, etc. As a result, the output unit 904 can notify the user 130 of the upgrade date candidate.

An example of an upgrade application screen displayed on the utilization terminal 120 will be described with reference to FIG. 10. Information input by the user 130, concerning this upgrade application screen, is included and transmitted in an inquiry for the upgrade date candidate.

FIG. 10 is an explanatory view of an example of the upgrade application screen displayed on the utilization terminal 120. The upgrade application screen includes a box indicating a login user name, an upgrade application button, and boxes for entering a designated upgrade-period. The upgrade application screen also includes a box for selecting the virtual environment VM to be upgraded, a box indicating configuration information of the virtual environment VM selected to be upgraded, and a box for selecting upgrade details.

When the user 130 selects the upgrade application button, an inquiry for the upgrade date candidate, including the virtual environment VM to be upgraded, the upgrade details, and the designated upgrade-period, is transmitted to the information providing apparatus 110.

With reference to FIGS. 11 to 14, description will be made of details of determination of a upgrade period candidate performed by the information providing apparatus 110 receiving the inquiry for the upgrade date candidate transmitted in FIG. 10.

First, details of determination of an upgrade period candidate based on the planned backup date and the planned restore date will be described with reference to FIGS. 11 and 12.

FIGS. 11A, 11B, and 11C are explanatory views of relationships among events of backup, restore, and upgrade.

In FIG. 11A, the upgrade is performed after the backup and before restore. (1) For example, first, the backup is performed and the configuration information of the virtual environment VM is stored. (2) The upgrade is performed to expand the hardware resources 140 assigned to the virtual environment VM.

(3) As a result of the restore, the virtual environment VM returns to the state at the time of the backup before performing the upgrade of (2). (4) Therefore, the same upgrade as (2) must be performed after the restore.

Thus, this is inconvenient for the provider side because the same upgrade is performed twice and the maintenance management work increases. On the other hand, this is inconvenient for the user 130 since the virtual environment VM becomes unusable twice due to the first and second upgrades.

In contrast, in FIG. 11B, the upgrade is performed after the backup and the restore. (1) For example, first, the backup is performed and the configuration information of the virtual environment VM is stored.

(2) As a result of the restore, the virtual environment VM returns to the state at the time of the backup. (3) The upgrade is performed to expand the hardware resources 140 assigned to the virtual environment VM.

Therefore, since the upgrade is performed after the restore, the upgrade in FIG. 11B does not cause inconveniences such as performing the same upgrade twice, unlike the upgrade in FIG. 11A.

In FIG. 11C, the upgrade is performed before the backup and the restore. (1) For example, first, the upgrade is performed to expand the hardware resources 140 assigned to the virtual environment VM.

(2) The backup is then performed and the configuration information of the virtual environment VM after the upgrade is stored. (3) As a result of the restore, the virtual environment VM returns to the state at the time of the backup (an already upgraded state).

Therefore, since the upgrade is performed before the backup, the upgrade in FIG. 11C does no cause disadvantages such as performing the same upgrade twice, unlike the upgrade in FIG. 11A.

As described above, in the relationship between the upgrade and the backup, no inconvenience occurs if the upgrade is performed before the backup. In the relationship between the upgrade and the restore, no disadvantage occurs if the upgrade is performed after the restore.

Determination of an upgrade period candidate based on the relationship among backup, restore, and upgrade depicted in FIGS. 11A, 11B, and 11C will be described with reference to FIG. 12.

FIG. 12 is an explanatory view of determination of an upgrade period candidate based on the relationship among backup, restore, and upgrade. First, the information providing apparatus 110 extracts from the event DB 300, records related to a virtual terminal to be upgraded. The information providing apparatus 110 sets the upgrade period candidate DB 500 based on the records extracted from the event DB 300 and obtains an upgrade period candidate.

For example, the information providing apparatus 110 refers to the planned restore date in the event DB 300 to set the planned restore-implementation fields of records in the upgrade period candidate DB 500. The information providing apparatus 110 stores "true" in a planned restore-implementation field if restore is planned, and stores "false" in the planned restore-implementation field if restore is not planned.

The information providing apparatus 110 refers to the planned backup date of the event DB 300 to set the planned backup-implementation fields of records in the upgrade period candidate DB 500. The information providing apparatus 110 stores "true" in a planned backup-implementation field if backup is planned and stores "false" in the planned backup-implementation fields if backup is not planned.

The information providing apparatus 110 determines that a period 1201 after the planned restore date is a period suitable for upgrade, based on the relationships depicted in FIGS. 11A, 11B, and 11C. The information providing apparatus 110 also determines that a period 1202 before the planned backup date is a period suitable for upgrade based on the relationships depicted in FIGS. 11A, 11B, and 11C.

Since the period 1201 overlaps the period 1202 in this case, the information providing apparatus 110 determines an overlapping period 1203 as the upgrade period candidate. The information providing apparatus 110 sets the upgrade period candidate DB 500 based on the determined upgrade period candidate. For example, the information providing apparatus 110 stores "true" in an upgrade candidate field of records for the overlapping period 1203 and stores "false" in the upgrade candidate field of records for the other periods.

However, if the period 1201 after the planned restore date does not overlap the period 1202 before the planned backup date, the information providing apparatus 110 may determine one of the periods as the upgrade period candidate. Alternatively, if the period 1201 after the planned restore date does not overlap the period 1202 before the planned backup date, the information providing apparatus 110 may determine the both periods as upgrade period candidates. If only one among the period 1201 after the planned restore date and the period 1202 before the planned backup date exists, the information providing apparatus 110 determines the one existing period as the upgrade period candidate.

Details of determination of the upgrade day-of-the-week candidate by the information providing apparatus 110 will be described with reference to FIG. 13. The upgrade day-of-the-week candidate is information used as an index for identifying a more suitable date for upgrade among dates within the upgrade period candidate determined in FIG. 12.

Figure 13:
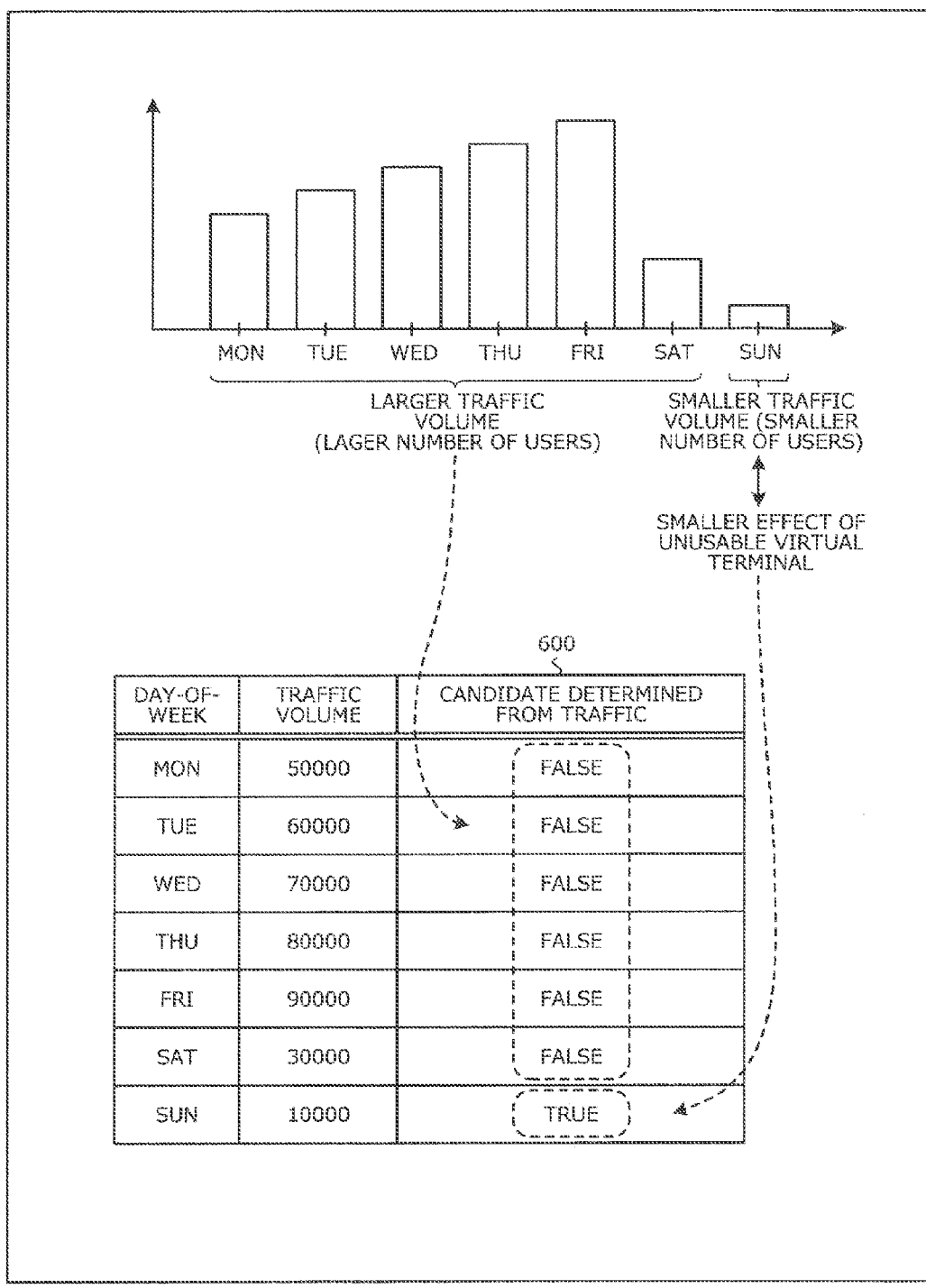
FIG. 13 is an explanatory view of details of determination of the upgrade day-of-the-week candidate.
Figure 14:
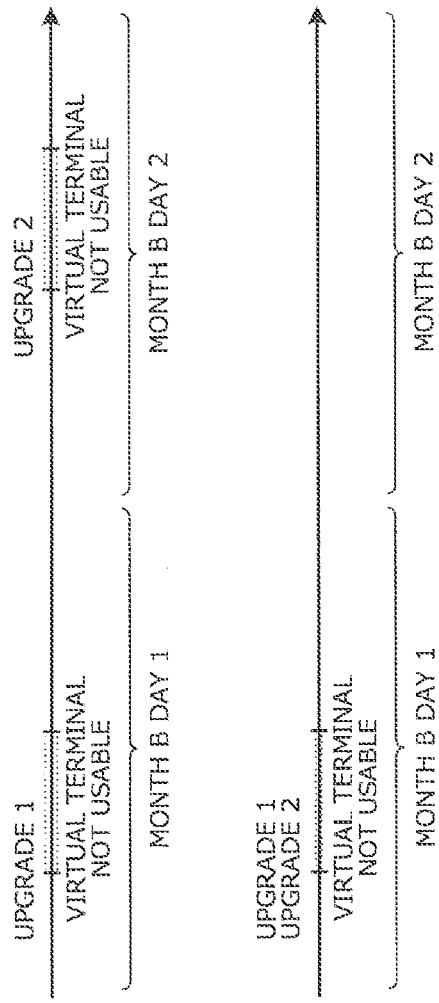
FIGS. 14A, 14B, and 14C are diagrams for explaining details of determination of the upgrade overlapping date.

FIG. 13 is an explanatory view of details of determination of the upgrade day-of-the-week candidate. As depicted in FIG. 13, according to the upgrade candidate day-of-week DB 600, the traffic volumes from Monday to Saturday are larger while the traffic volume of Sunday is smaller.

To upgrade the virtual environment VM, the virtual environment VM must be put into an unusable state. Therefore, if the upgrade is performed on the day of the week with a large traffic volume, i.e., a large number of the users 130 of the virtual environment VM, the unusable virtual environment VM inconveniences a large number of the users 130.

In contrast, if upgrade is performed on a day of the week with a smaller traffic volume, i.e., a smaller number of the users 130 of the virtual environment VM, the unusable virtual environment VM inconveniences only a small number of the users 130.

Therefore, the information providing apparatus 110 determines Sunday as the upgrade day-of-the-week candidate. The information providing apparatus 110 stores "true" for Sunday having a smaller traffic volume and "false" for Monday to Saturday having larger traffic volumes, in the fields indicating candidates determined from traffic of the upgrade candidate day-of-week DB 600.

As a result, the information providing apparatus 110 can determine that Sunday determined as the upgrade day-of-the-week candidate is the more suitable day for upgrade among the dates within the upgrade period candidate determined in FIG. 12.

Details of determination of an upgrade overlapping date by the information providing apparatus 110 will be described with reference to FIGS. 14A, 14B, and 14C. The upgrade overlapping date is a date on which the determined planned upgrade date overlaps the upgrade date candidate, and is information used as an index for identifying a more suitable date for upgrade among dates within the upgrade period candidate determined in FIG. 12.

FIGS. 14A, 14B, and 14C are diagrams for explaining details of determination of the upgrade overlapping date. To upgrade the virtual environment VM, the virtual environment VM must be put into an unusable state.

Therefore, if two upgrades are separately performed as depicted in FIG. 14A, inconvenience is caused by the unusable virtual environment VM on both days.

In contrast, if the two upgrades are performed on the same date as depicted in FIG. 14B, the virtual environment VM is unusable only on one day. Multiple upgrades should be performed on the same day as far as possible as described above.

Therefore, as depicted in FIG. 14C, the information providing apparatus 110 determines the already determined planned upgrade dates as the upgrade overlapping dates. The information providing apparatus 110 stores "true" for the same dates as the planned upgrade dates and "false" for the other dates in the fields indicating candidates determined from planned upgrade-implementation of the upgrade date candidate DB 700.

As a result, the information providing apparatus 110 can determine that the dates determined as the upgrade overlapping dates are the more suitable dates for upgrade among the dates within the upgrade period candidate determined in FIG. 12.

Details of the determination of the upgrade date candidate will be described. The information providing apparatus 110 calculates a candidate degree indicative of whether a date is suitable for upgrade based on the upgrade period candidate, the upgrade day-of-the-week candidate, and the upgrade overlapping date determined in FIGS. 11 to 14. The information providing apparatus 110 sets the final upgrade date candidate DB 800 based on the calculated candidate degree.

Based on the candidate degree stored in the final upgrade date candidate DB 800, the information providing apparatus 110 determines the upgrade date candidate suitable for upgrade and outputs the determined upgrade date candidate to the utilization terminal 120. For example, a date having a candidate degree greater than or equal to one is determined as the upgrade date candidate.

Details of notification of the upgrade date candidate will be described with reference to FIG. 15.

FIG. 15 is an explanatory view of details of notification of the upgrade date candidate. The information providing apparatus 110 transmits all the determined upgrade date candidates to the utilization terminal 120. As depicted in FIG. 15, the information providing apparatus 110 describes and transmits to the utilization terminal 120, the upgrade date candidates and a link for setting the upgrade date. The notification of the upgrade date candidates is transmitted by e-mail, for example.

However, configuration may be such that the information providing apparatus 110 does not allow the utilization terminal 120 to perform the upgrade, for example, in a case when the upgrade date candidate cannot be determined because no date has a candidate degree greater than or equal to one. If the utilization terminal 120 is not allowed to perform the upgrade, the information providing apparatus 110 may describe and transmit the non-approval of the upgrade in the notification of the upgrade date candidate.

An upgrade date determination screen displayed on the utilization terminal 120 receiving the notification depicted in FIG. 15 will be described with reference to FIG. 16.

FIG. 16 is an explanatory view of details of the upgrade date determination screen. The upgrade date determination screen is displayed through the link described in FIG. 15. On the upgrade date determination screen depicted in FIG. 16, the user 130 selects a displayed upgrade date candidate and selects an upgrade date determination button. As a result, the upgrade date is determined.

Details of an upgrade date determination process executed by the utilization terminal 120 described with reference to FIGS. 10 and 16 will be described with reference to FIG. 17.

Figure 17:
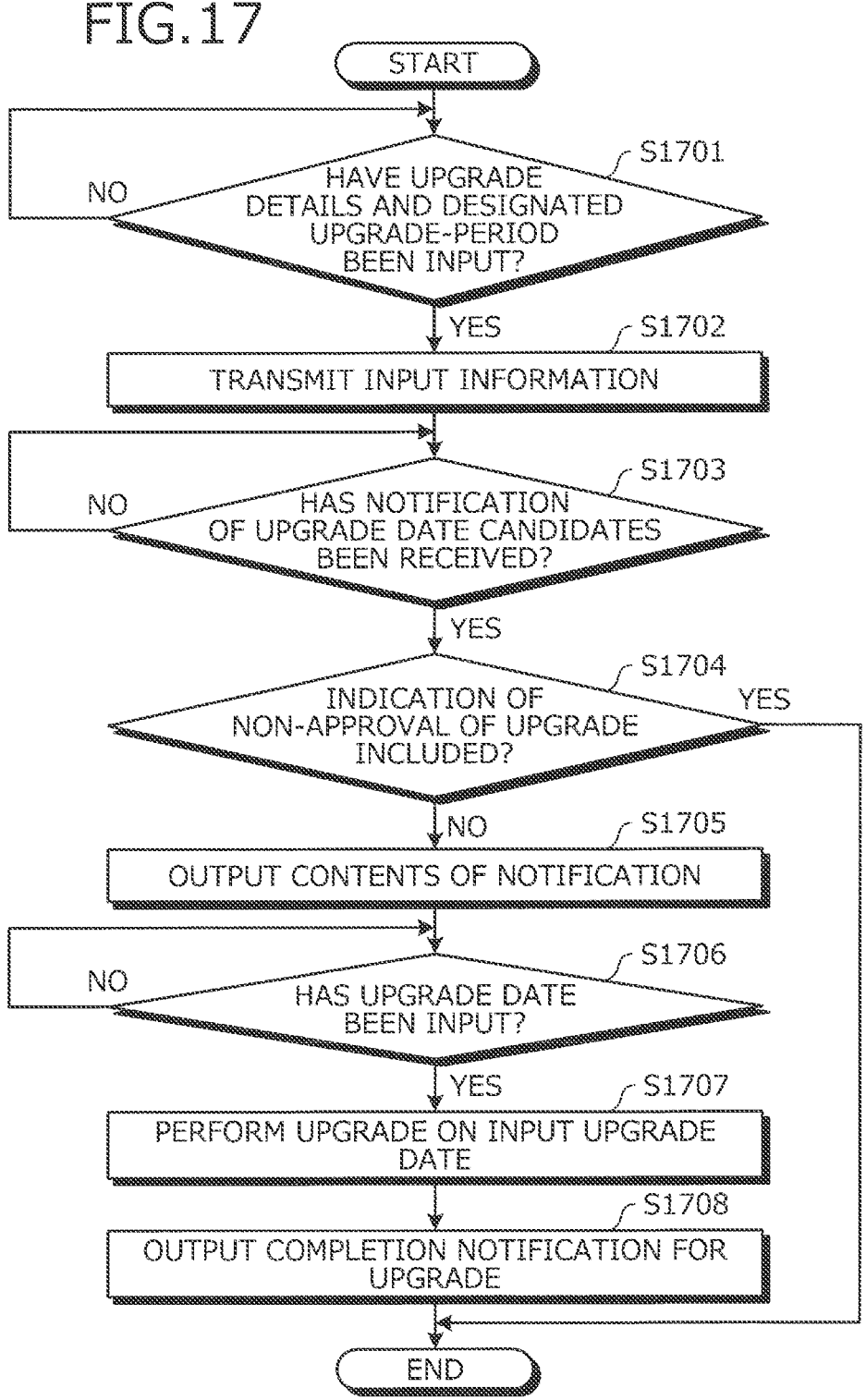
FIG. 17 is a flowchart of details of the upgrade date determination process.

FIG. 17 is a flowchart of details of the upgrade date determination process. First, the utilization terminal 120 determines whether upgrade details and a designated upgrade-period have been input on the upgrade application screen depicted in FIG. 10 (step S1701).

If not (step S1701: NO), the utilization terminal 120 returns to step S1701 and waits for input. On the other hand, if upgrade details and a designated upgrade-period have been input (step S1701: YES), the utilization terminal 120 transmits the input information to the information providing apparatus 110 (step S1702).

The utilization terminal 120 determines whether notification of upgrade date candidates has been received (step S1703). If notification of upgrade date candidates has not been received (step S1703: NO), the utilization terminal 120 returns to step S1703 and waits for reception.

On the other hand, if received (step S1703: YES), the utilization terminal 120 determines whether indication of non-approval of upgrade is included in the notification of the upgrade candidate (step S1704). If indication of non-approval of upgrade is included (step S1704: YES), the utilization terminal 120 terminates the upgrade date determination process.

On the other hand if indication of non-approval of upgrade is not included (step S1704: NO), the utilization terminal 120 outputs contents of the notification of the upgrade date candidate (step S1705). The utilization terminal 120 then determines whether an upgrade date has been input from the user 130 (step S1706).

If not (step S1706: NO), the utilization terminal 120 returns to step S1706 and waits for input. On the other hand, if an upgrade date has been input (step S1706: YES), the utilization terminal 120 performs the upgrade on the input upgrade date (step S1707).

The utilization terminal 120 outputs completion notification for the upgrade (step S1708), and terminates the upgrade date determination process. As a result, an inquiry for an upgrade date candidate can be made to the information providing apparatus 110 to perform upgrade on the suitable upgrade date candidate.

Details of an upgrade date candidate determination process executed by the information providing apparatus 110 described with reference to FIGS. 11 to 15 will be described with reference to FIGS. 18 to 21.

Figure 18:
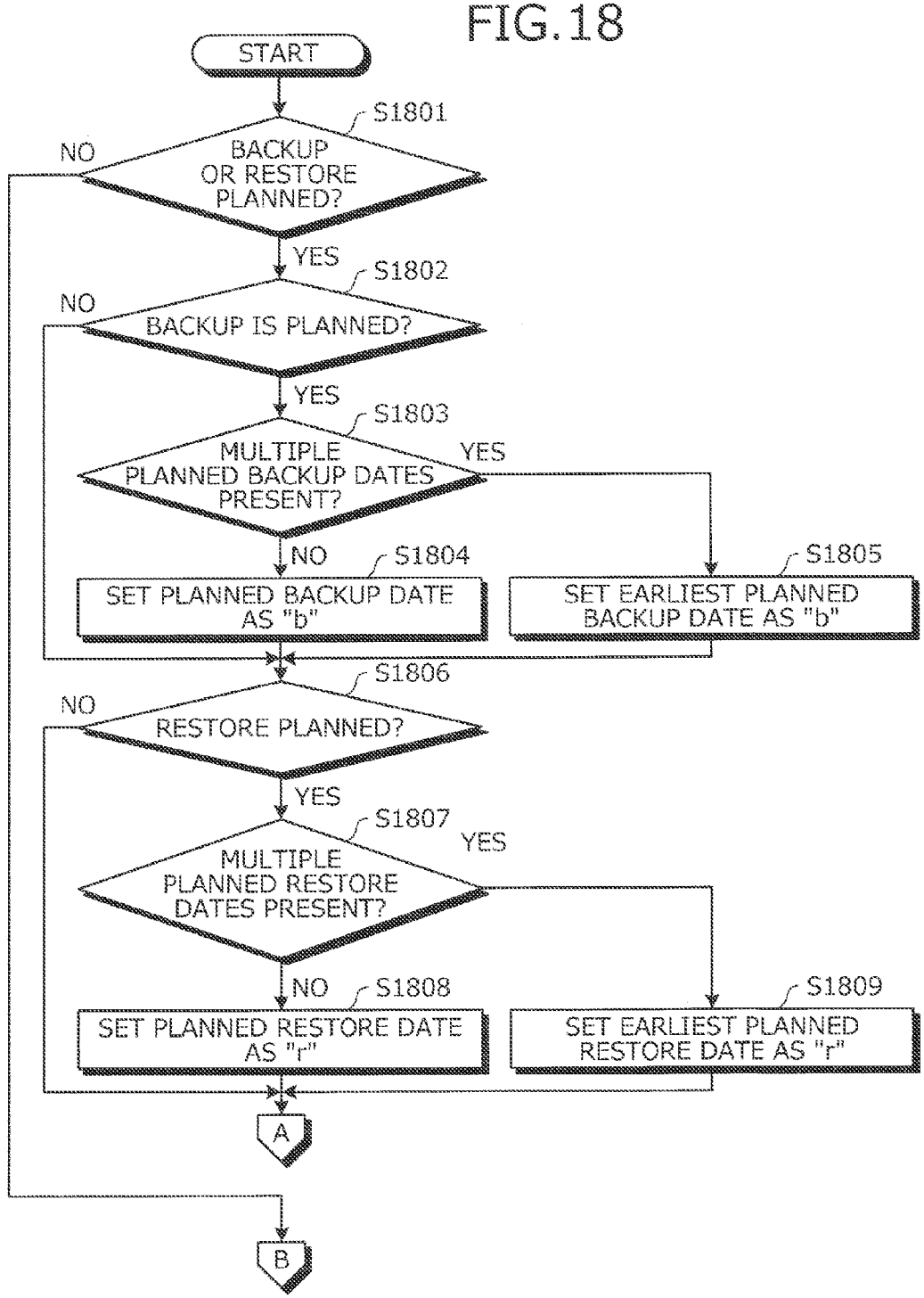
FIG. 18 is a flowchart of details of an upgrade date candidate determination process (part 1)

FIGS. 18, 19, 20 and 21 are flowcharts of details of the upgrade date candidate determination process. In FIG. 18, first, the CPU 201 determines whether backup or restore is planned (step S1801). If neither backup nor restore is planned (step S1801: NO), the CPU 201 goes to step S2001 of FIG. 20.

On the other hand, if backup or restore is planned (step S1801: YES), the CPU 201 determines whether backup is planned (step S1802). If backup is not planned (step S1802: NO), the CPU 201 goes to step S1806.

On the other hand, if backup is planned (step S1802: YES), the CPU 201 determines whether multiple planned backup dates are present (step S1803). If one planned backup date is present (step S1803: NO), the CPU 201 sets the one planned backup date as "b" (step S1804). The CPU 201 goes to step S1806.

On the other hand, if multiple planned backup dates are present (step S1803: YES), the CPU 201 sets the earliest planned backup date as "b" among the multiple planned backup dates (step S1805). The CPU 201 goes to step S1806.

The CPU 201 determines whether restore is planned (step S1806). If restore is not planned (step S1806: NO), the CPU 201 goes to step S1901 of FIG. 19.

On the other hand, if restore is planned (step S1806: YES), the CPU 201 determines whether multiple planned restore dates are present (step S1807). If one planned restore date is present (step S1807: NO), the CPU 201 sets the one planned restore date as "r" (step S1808). The CPU 201 goes to step S1901 of FIG. 19.

On the other hand, if multiple planned restore dates are present (step S1807: YES), the CPU 201 sets the earliest planned restore date as "r" among the multiple planned restore dates (step S1809). The CPU 201 goes to step S1901 of FIG. 19.

Figure 19:
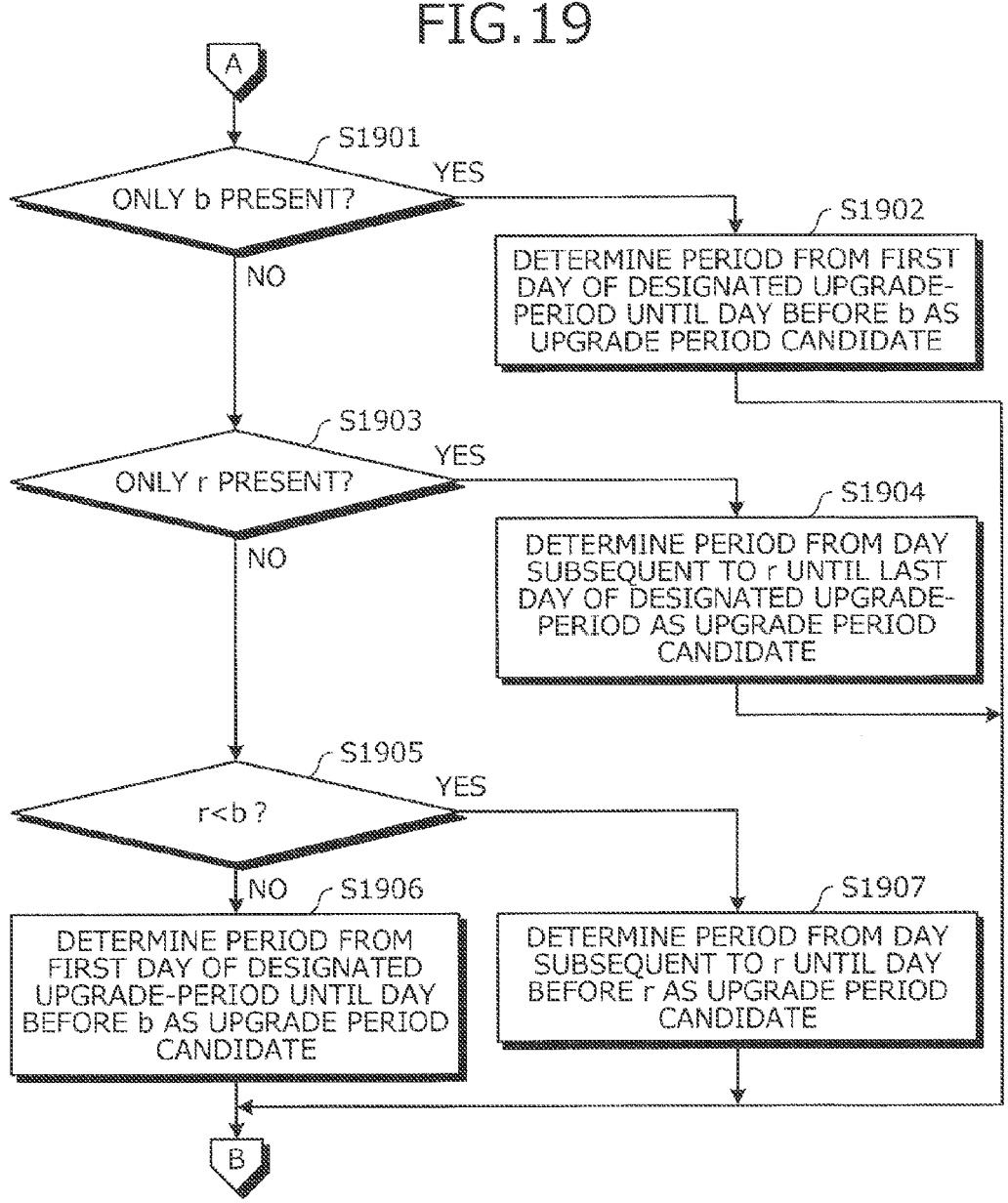
FIG. 19 is a flowchart of details of the upgrade date candidate determination process (part 2)

In FIG. 19, first, the CPU 201 determines whether only b is present (step S1901). If only b is present (step S1901: YES), the CPU 201 determines the period from the first day of the designated upgrade-period until the day before b as the upgrade period candidate (step S1902). The CPU 201 goes to step S2001 of FIG. 20.

On the other hand, if b is absent or, b and r are present (step S1901: NO), the CPU 201 determines whether only r is present (step S1903). If only r is present (step S1903: YES), the CPU 201 determines the period from the day subsequent to r until the last day of the designated upgrade-period as the upgrade period candidate (step S1904). The CPU 201 goes to step S2001 of FIG. 20.

On the other hand, if b and r are present (step S1903: NO), the CPU 201 determines whether r<b is satisfied (step S1905). If r<b is not satisfied (step S1905: NO), the CPU 201 determines the period from the first day of the designated upgrade-period until the day before b as the upgrade period candidate (step S1906). The CPU 201 goes to step S2001 of FIG. 20.

On the other hand, if r<b is satisfied (step S1905: YES), the CPU 201 determines the period from the day subsequent to r until the day before r as the upgrade period candidate (step S1907). The CPU 201 goes to step S2001 of FIG. 20. The process depicted in FIGS. 18 and 19 corresponds to the details depicted in FIGS. 11 and 12.

Figure 20:
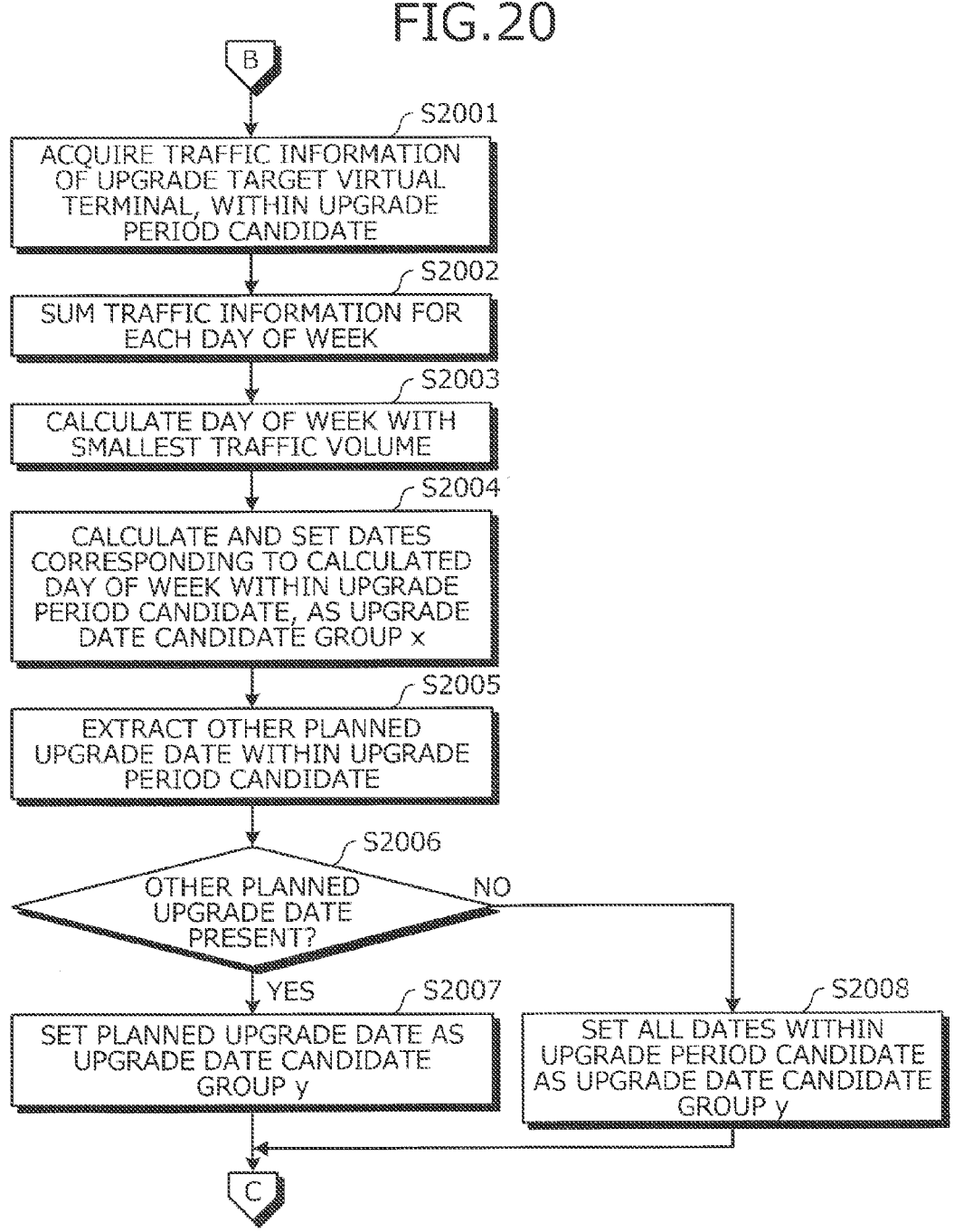
FIG. 20 is a flowchart of details of the upgrade date candidate determination process (part 3)

In FIG. 20, first, the CPU 201 acquires traffic information of an upgrade target virtual terminal, within the upgrade period candidate (step S2001). The CPU 201 sums the traffic information for each day of the week (step S2002) to create the traffic log 400.

The CPU 201 calculates the day of the week with the smallest traffic volume (step S2003). The CPU 201 calculates and sets dates corresponding to the calculated day of the week within the upgrade period candidate, as an upgrade date candidate group x (step S2004).

The CPU 201 refers to the event DB 300 to extract another planned upgrade date within the upgrade period candidate (step S2005). The CPU 201 determines whether another planned upgrade date is present (step S2006).

If another planned upgrade date is present (step S2006: YES), the CPU 201 sets the planned upgrade date as an upgrade date candidate group y (step S2007). The CPU 201 goes to step S2101 of FIG. 21.

On the other hand, if another planned upgrade date is not present (step S2006: NO), the CPU 201 sets all the dates within the upgrade period candidate as the upgrade date candidate group y (step S2008). The CPU 201 goes to step S2101 in FIG. 21.

Steps S2001 to S2004 in FIG. 20 correspond to the details depicted in FIG. 13. Steps S2005 to S2008 in FIG. 20 correspond to the details depicted in FIGS. 14A, 14B, and 14C.

Figure 21:
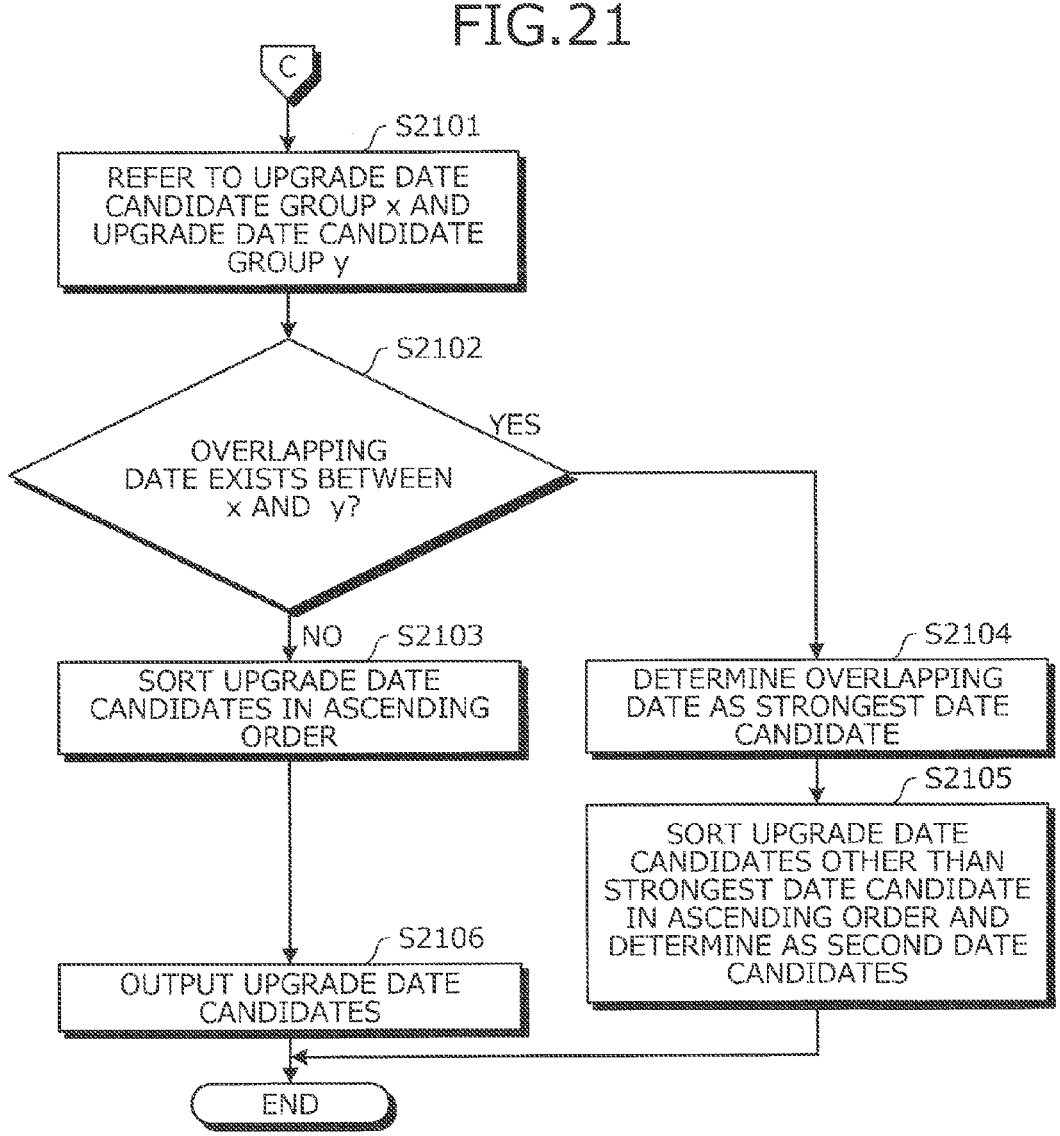
FIG. 21 is a flowchart of details of the upgrade date candidate determination process (part 4).

In FIG. 21, first, the CPU 201 refers to the upgrade date candidate group x and the upgrade date candidate group y (step S2101). The CPU 201 determines whether an overlapping date exists between the upgrade date candidate group x and the upgrade date candidate group y (step S2102).

If no overlapping date exists (step S2102: NO), the CPU 201 sorts the upgrade date candidates in the upgrade date candidate group x and the upgrade date candidate group y in ascending order (step S2103) and goes to step S2106.

On the other hand, if an overlapping date exists (step S2102: YES), the CPU 201 determines the overlapping date as the strongest date candidate (step S2104). The CPU 201 sorts the upgrade date candidates other than the strongest date candidate in ascending order and determines the sorted upgrade date candidates as second date candidates (step S2105) and goes to step S2106.

Lastly, the CPU 201 outputs the upgrade date candidates sorted at step S2103 or, the strongest date candidate and the second date candidates determined at steps S2104 and S2105 (step S2106). The CPU 201 terminates the upgrade date candidate determination process. As a result, the dates suitable for upgrade can be output as the upgrade date candidates.

As described above, according to the information providing apparatus 110, an information providing method, and an information providing program, a date suitable for upgrade is determined as an upgrade date candidate on the service provider side based on the information of the provider side. Therefore, an upgrade date candidate suitable for upgrade based on the information on the provider side can be provided to the user 130 of the service while the information of the provider side is kept confidential.

As a result, since the upgrade is performed on a suitable date, the downtime of the virtual environment VM due to the upgrade can be reduced and the maintenance management work can be made more efficient. Since the information on the provider side is not directly known by the user 130 of the service, the security of the provider side can be ensured and the stable provision of the service can be achieved.

Since a date within a period before the planned backup date is determined as the upgrade date candidate, the inconvenience of performing the same upgrade more than once can be prevented. Since a date within a period after the planned restore date is determined as the upgrade date candidate, the inconvenience of performing the same upgrade more than once can be prevented.

If multiple planned backup dates are present, a date within a period before the earliest planned backup date is determined as the upgrade date candidate. As a result, upgrade is performed on the earliest possible date to improve the convenience of the service. If multiple planned restore dates are present, a date within a period after the earliest planned restore date is determined as the upgrade date candidate. As a result, upgrade is performed on the earliest possible date to improve the convenience of the service.

Since the upgrade date candidate is determined based on information related to the service utilization frequency, the number of the users 130 affected by a service suspension due to upgrade can be minimized.

Since multiple upgrades are performed on the same day as far as possible, the downtime of the service due to upgrade is made as short as possible to improve the convenience of the service.

Since a date within a designated upgrade-period designated by the user 130 is determined as an upgrade date candidate, a suitable upgrade date candidate can be determined based on the demand of the user 130 and the information on the provider side.

The information providing method described in the present embodiment may be implemented by executing a prepared program on a computer such as a personal computer and a workstation. This information providing program is stored on a non-transitory, computer-readable recording medium such as a hard disk, a flexible disk, a CD-ROM, an MO, and a DVD, read out from the computer-readable medium, and executed by the computer.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information providing apparatus comprising:
   a processor configured to input an inquiry for a change date candidate for changing specifications of hardware resources allocated to a virtual environment for information processing related to a service, the inquiry including information identifying a third period; and
   a storage configured to store at least one among a planned backup date for a process result of the information processing related to the service and a planned restore date for the information processing related to the service using the process result, wherein the processor is further configured to
- determine as the change date candidate, a date within a first period, a second period, and the third period, the first period being from a date of input of the inquiry until the planned backup date and the second period being after the planned restore date, by referring to the storage, and to output the determined change date candidate;
- determine a date within the second period as the change date candidate when the planned backup date is later than the planned restore date; and
- when determining the change date candidate is within the second period:
  - acquire traffic information within the second period;
  - sum traffic information for respective days of a week within the second period;
  - calculate a day of the week among the respective days of the week with a smallest traffic volume; and
  - calculate and set a date corresponding to the calculated day of the week within the second period as the change date candidate.

2. The information providing apparatus according to claim 1, wherein
the processor determines a day within the first period as the change date candidate, when the planned backup date is a date before the planned restore date.

3. The information providing apparatus according to claim 1, wherein
the processor determines the change date candidate based on information related to a utilization frequency of the service.

4. The information providing apparatus according to claim 1, wherein
the processor determines an already determined planned change date for the specifications as the change date candidate.

5. An information providing method of a computer having access to a storage configured to store at least one among a planned backup date for a process result of information processing related to a service and a planned restore date for the information processing related to the service using the process result, the information providing method comprising:
- inputting an inquiry for a change date candidate for changing specifications of hardware resources allocated to a virtual environment for the information processing related to the service, the inquiry including information identifying a third period;
- determining as the change date candidate, a date within a first period, a second period, and the third period, the first period being from a date of input of the inquiry until the planned backup date and the second period being after the planned restore date, by referring to the storage;
- determining a date within the second period as the change date candidate when the planned backup date is later than the planned restore date; and
- outputting the determined change date candidate;
- when determining the change date candidate is within the second period:
  - acquiring traffic information within the second period;
  - summing traffic information for respective days of a week within the second period;
  - calculating a day of the week among the respective days of the week with a smallest traffic volume; and
  - calculating and setting a date corresponding to the calculated day of the week within the second period as the change date candidate.

6. A non-transitory computer-readable recording medium storing an information providing program that causes a computer having access to a storage unit configured to store at least one among a planned backup date for a process result of information processing related to a service and a planned restore date for the information processing related to the service using the process result, to execute a process comprising:
- inputting an inquiry for a change date candidate for changing specifications of hardware resources allocated to a virtual environment for the information processing related to the service, the inquiry including information identifying a third period;
- determining as the change date candidate, a date within a first period, a second period, and the third period, the first period being from a date of input of the inquiry until the planned backup date and the second period being after the planned restore date, by referring to the storage;
- determining a date within the second period as the change date candidate when the planned backup date is later than the planned restore date; and
- outputting the determined change date candidate;
- when determining the change date candidate is within the second period:
  - acquiring traffic information within the second period;
  - summing traffic information for respective days of a week within the second period;
  - calculating a day of the week among the respective days of the week with a smallest traffic volume; and
  - calculating and setting a date corresponding to the calculated day of the week within the second period as the change date candidate.

7. The information providing apparatus according to claim 1, wherein the processor is further configured to
- determine a date within the first period as the change date candidate when the planned backup date is not later than the planned restore date;
- when determining the change date candidate is within the first period:
  - acquire traffic information within the first period;
  - sum traffic information for respective days of a week within the first period;
  - calculate a day of the week among the respective days of the week with a smallest traffic volume; and
  - calculate and set a date corresponding to the calculated day of the week within the first period as the change date candidate.

8. The information providing method according to claim 5, the process further comprising
- determining a date within the first period as the change date candidate when the planned backup date is not later than the planned restore date;
- when determining the change date candidate is within the first period:
  - acquiring traffic information within the first period;

summing traffic information for respective days of a week within the first period;

calculating a day of the week among the respective days of the week with a smallest traffic volume; and calculating and setting a date corresponding to the calculated day of the week within the first period as the change date candidate.

9. The non-transitory computer-readable recording medium according to claim 6, the process further comprising determining a date within the first period as the change date candidate when the planned backup date is not later than the planned restore date;

when determining the change date candidate is within the first period:

acquiring traffic information within the first period;

summing traffic information for respective days of a week within the first period;

calculating a day of the week among the respective days of the week with a smallest traffic volume; and calculating and setting a date corresponding to the calculated day of the week within the first period as the change date candidate.

\* \* \* \* \*